(12) United States Patent
Matsumoto

(10) Patent No.: US 12,140,078 B2
(45) Date of Patent: Nov. 12, 2024

(54) CONTROL DEVICE FOR POWER UNIT SYSTEM

(71) Applicant: HONDA MOTOR CO., LTD., Tokyo (JP)

(72) Inventor: Takeshi Matsumoto, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/173,992

(22) Filed: Feb. 24, 2023

(65) Prior Publication Data

US 2023/0272748 A1 Aug. 31, 2023

(30) Foreign Application Priority Data

Feb. 28, 2022 (JP) ................ 2022-028778

(51) Int. Cl.
*F02C 7/22* (2006.01)
*F01D 15/10* (2006.01)
*F02C 6/14* (2006.01)

(52) U.S. Cl.
CPC ............ *F02C 7/22* (2013.01); *F01D 15/10* (2013.01); *F02C 6/14* (2013.01); *F05D 2220/76* (2013.01)

(58) Field of Classification Search
CPC .......... F02C 6/14; B64D 27/33; B64D 27/06; B64D 35/022; B64D 31/18
See application file for complete search history.

(56) References Cited

U.S. PATENT DOCUMENTS

| 11,421,606 B2 * | 8/2022 | Lamarre | ................ F02C 6/206 |
| 2006/0220387 A1 | 10/2006 | Tsuzuki | |
| 2019/0280583 A1 * | 9/2019 | Nagafuchi | ......... H02K 11/0094 |

FOREIGN PATENT DOCUMENTS

JP 2006-274868 A 10/2006

* cited by examiner

*Primary Examiner* — Gerald L Sung
*Assistant Examiner* — Jacek Lisowski
(74) *Attorney, Agent, or Firm* — Rankin, Hill & Clark LLP

(57) ABSTRACT

When the output power of a gas turbine is going to be reduced and when the relationship between the target output power and the rotational frequency of the gas turbine satisfies predetermined conditions, a control device of a power unit system reduces the output power of the gas turbine to the target output power and thereafter reduces the rotational frequency of the gas turbine to the target rotational frequency, whereas when the relationship between the target output power and the rotational frequency of the gas turbine does not satisfy the predetermined conditions, the control device reduces the rotational frequency of the gas turbine to the target rotational frequency and thereafter reduces the output power of the gas turbine to the target output power.

2 Claims, 10 Drawing Sheets

FIG. 9

| OUTPUT AT START OF OUTPUT POWER REDUCTION CONTROL [W] | TARGET OUTPUT POWER [W] | CONDITION | REQUIRED TIME [s] (FIRST OUTPUT POWER REDUCTION CONTROL) | REQUIRED TIME [s] (SECOND OUTPUT POWER REDUCTION CONTROL) |
|---|---|---|---|---|
| P6 | P2 | NOT SATISFIED | 12.91 | 0.66 |
| P6 | P3 | SATISFIED | 0.01 | 0.4 |
| P6 | P4 | SATISFIED | 0.01 | 0.25 |
| P6 | P5 | SATISFIED | 0.01 | 0.02 |
| P2 | P1 | NOT SATISFIED | 5.78 | 2.9 |

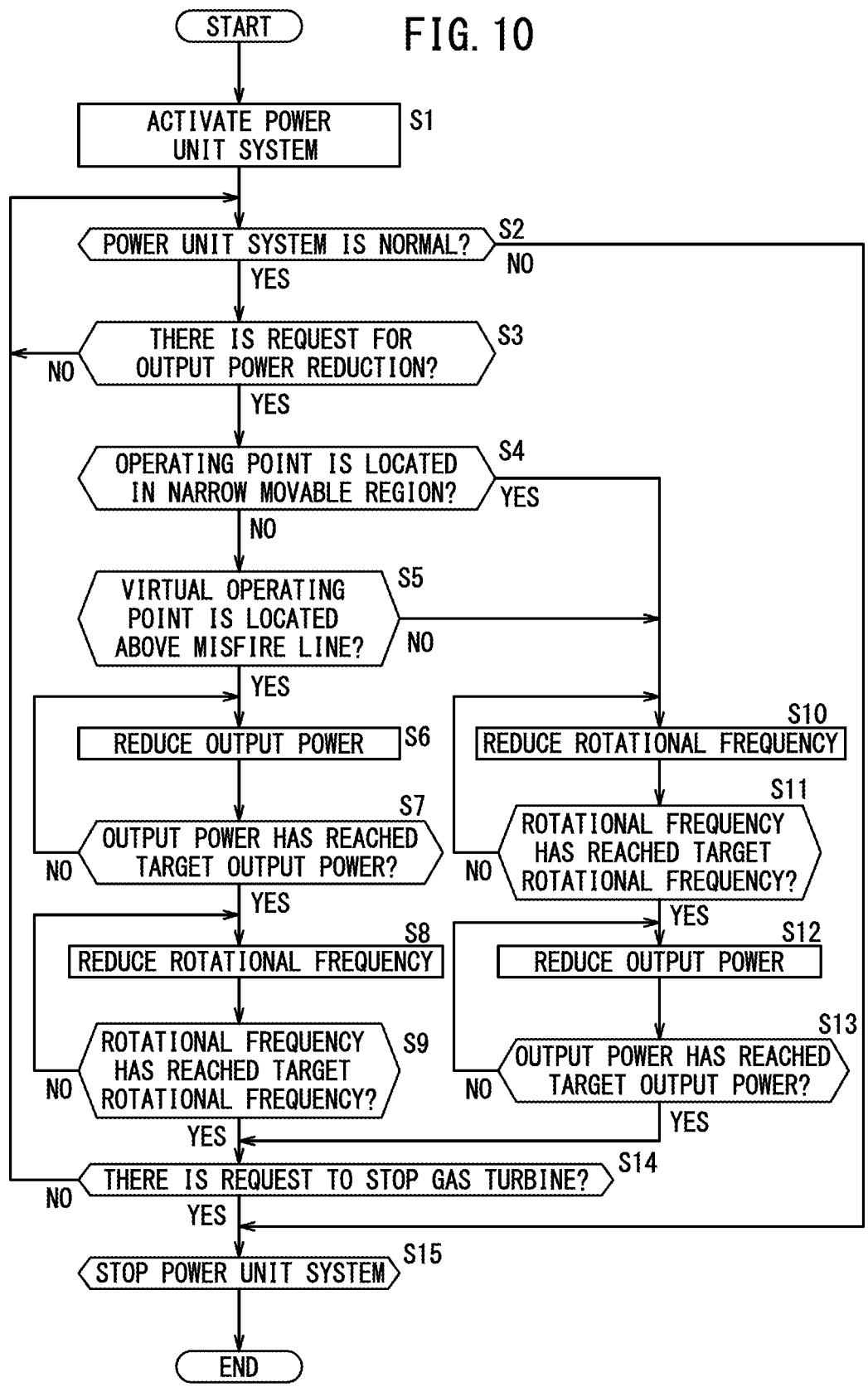

… (1/2)

CONTROL DEVICE FOR POWER UNIT SYSTEM

CROSS-REFERENCE TO RELATED APPLICATIONS

This application is based upon and claims the benefit of priority from Japanese Patent Application No. 2022-028778 filed on Feb. 28, 2022, the contents of which are incorporated herein by reference.

BACKGROUND OF THE INVENTION

Field of the Invention

The present invention relates to a control device for a power unit system.

Description of the Related Art

JP 2006-274868 A discloses a control device for a gas turbine generator. The gas turbine generator is driven by the gas turbine. In this way, the generator generates electric power. When increasing the amount of power generated by the generator, the control device reduces the load of the generator by supplying power from a battery to the load. The rotational frequency (speed) of the gas turbine is increased while the load of the generator is reduced. Thereafter, the control device increases the output power of the gas turbine to increase the amount of power generated by the generator.

SUMMARY OF THE INVENTION

According to the technology disclosed in JP 2006-274868 A, when the output power of the gas turbine is increased, the rotational frequency of the gas turbine can be increased in a short time. However, with respect to a case where the output power of the gas turbine is reduced, there is room for improvement in reducing the rotational frequency of the gas turbine in a short time.

An object of the present invention is to solve the aforementioned problem.

A control device for a power unit system includes: a gas turbine that includes a compressor and a turbine rotating together with the compressor; a generator that is driven by the gas turbine; a battery that stores electric power generated by the generator; a required power setting unit that sets required power for the generator; a fuel injection amount setting unit that controls an injection amount of fuel to be injected into a combustion chamber of the gas turbine; a target rotational frequency setting unit that sets a target rotational frequency of the gas turbine with respect to target output power of the gas turbine; and a condition determination unit that determines whether a relationship between the target output power and the rotational frequency of the gas turbine satisfies predetermined conditions, wherein when the output power of the gas turbine is going to be reduced and when the relationship between the target output power and the rotational frequency of the gas turbine satisfies the predetermined conditions, the required power setting unit reduces the required power and the fuel injection amount setting unit reduces the injection amount, whereby the output power of the gas turbine is reduced to the target output power, and thereafter the required power setting unit maintains the required power and the fuel injection amount setting unit reduces the injection amount, whereby the rotational frequency of the gas turbine is reduced to the target rotational frequency, and when the output power of the gas turbine is going to be reduced and when the relationship between the target output power and the rotational frequency of the gas turbine does not satisfy the predetermined conditions, the required power setting unit maintains the required power and the fuel injection amount setting unit reduces the injection amount, whereby the rotational frequency of the gas turbine is reduced to the target rotational frequency, and thereafter the required power setting unit reduces the required power and the fuel injection amount setting unit reduces the injection amount, whereby the output power of the gas turbine is reduced to the target output power.

According to the present invention, when the output power of the gas turbine is reduced, the rotational frequency of the gas turbine can be reduced in a short time.

The above and other objects features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 9 is a table comparing time periods required to reduce the output power of the gas turbine to a target output power.

FIG. 10 is a flowchart showing a process of the output power reduction control.

DETAILED DESCRIPTION OF THE INVENTION

First Embodiment

Overall Configuration

Figure 1:
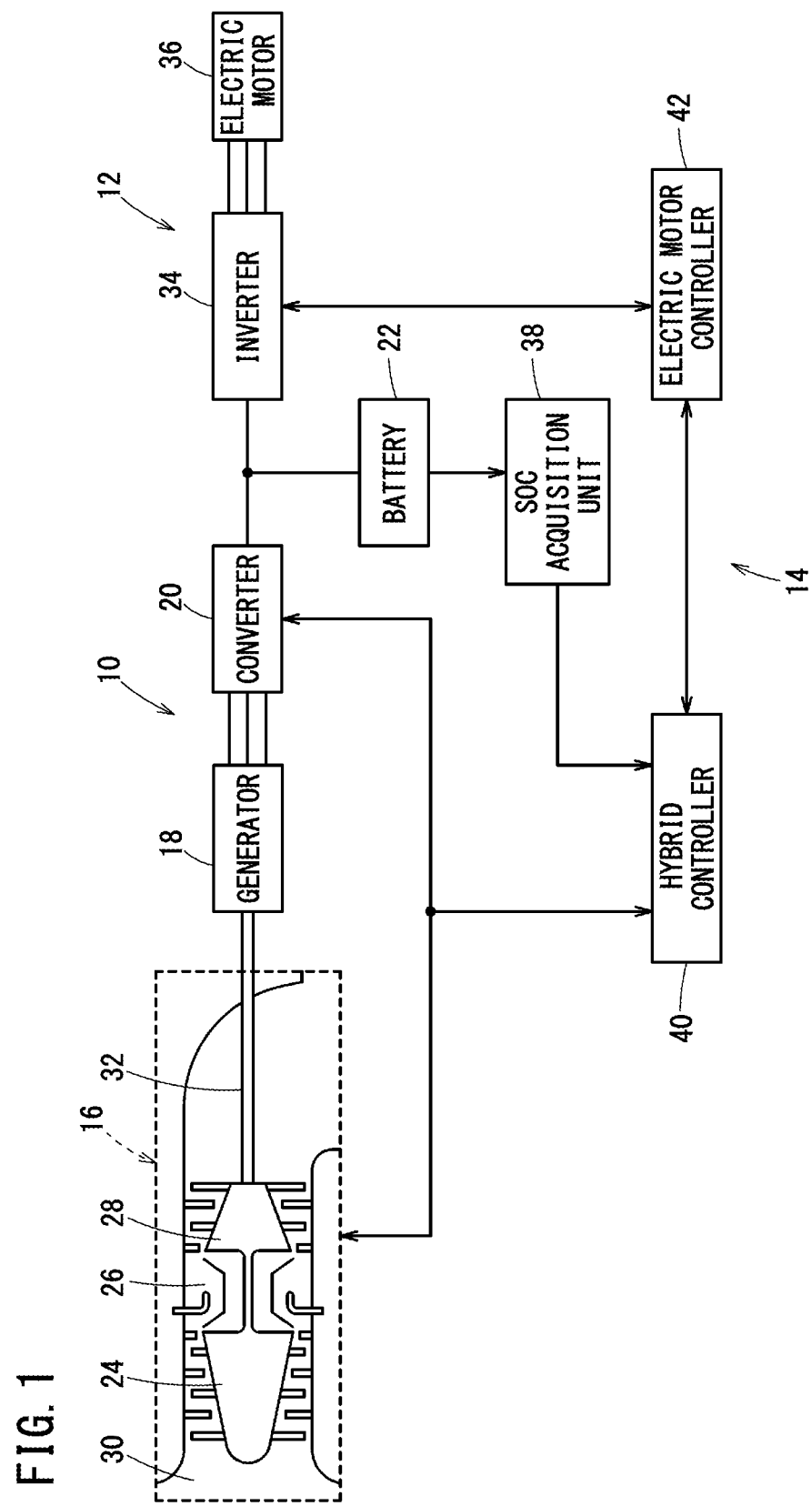
FIG. 1 is a schematic diagram showing a configuration of a power unit system, a drive unit, and a control unit.

FIG. 1 is a schematic diagram showing a configuration of a power unit system 10, a drive unit 12, and a control unit 14.

The power unit system 10 includes a gas turbine 16, a generator 18, a converter 20, and a battery 22. The gas turbine 16 generates rotational energy that drives the generator 18. The generator 18 generates power by being driven by the gas turbine 16. The converter 20 converts AC power generated by the generator 18 into DC power and outputs the DC power. The battery 22 stores part of the electric power generated by the generator 18.

The gas turbine 16 includes a compressor 24, a combustion chamber 26, and a turbine 28. The air taken in from a suction port 30 is compressed by the compressor 24. The air having been compressed to have high pressure is sent to the combustion chamber 26. In the combustion chamber 26, fuel is injected into the high-pressure air and burned. As a result, high-temperature and high-pressure gas is generated in the combustion chamber 26. This gas rotates the turbine 28. The energy of the high-temperature and high-pressure gas is converted into rotational energy by the turbine 28 and extracted by an output shaft 32. Part of this rotational energy is also used to rotate the compressor 24.

The drive unit 12 includes an inverter 34 and an electric motor 36. The inverter 34 converts the DC power supplied from the converter 20 or the battery 22 into AC power and outputs the AC power to the electric motor 36. The electric motor 36 is driven by the power supplied from the inverter 34.

The control unit 14 includes an SOC acquisition unit 38, a hybrid controller 40, and an electric motor controller 42. The SOC acquisition unit 38 acquires the state of charge (SOC) of the battery 22. The hybrid controller 40 controls the gas turbine 16 and the converter 20 based on the required power input from the electric motor controller 42 and the SOC of the battery 22 input from the SOC acquisition unit 38. Thus, the output power and the rotational frequency (speed) of the gas turbine 16 are controlled. The hybrid controller 40 corresponds to a control device of the present invention. The electric motor controller 42 controls the inverter 34 based on the generated power of the generator 18 input from the hybrid controller 40 and the SOC of the battery 22 input from the SOC acquisition unit 38 via the hybrid controller 40. Thus, the output power and the rotational frequency of the electric motor 36 are controlled.

Configuration of Hybrid Controller

Figure 2:
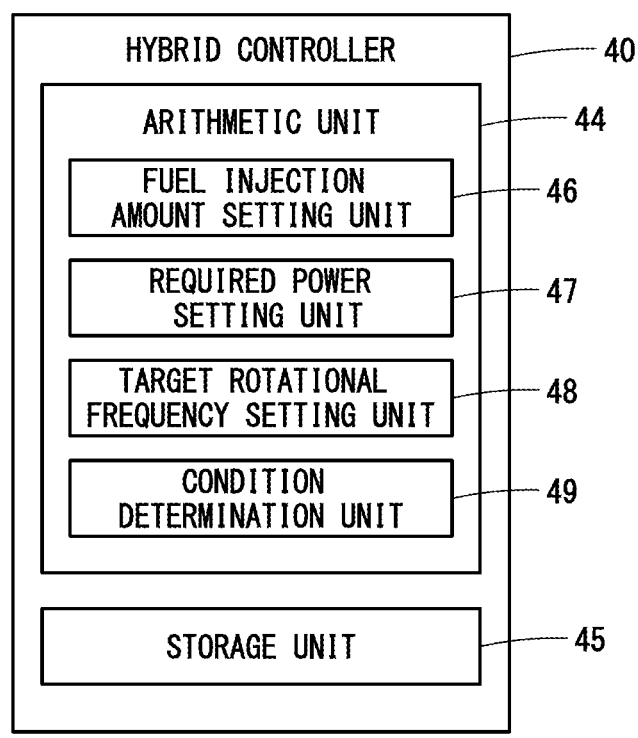
FIG. 2 is a block diagram showing a configuration of a hybrid controller.

FIG. 2 is a block diagram showing the configuration of the hybrid controller 40.

The hybrid controller 40 includes an arithmetic unit 44 and a storage unit 45. The arithmetic unit 44 is, for example, a processor such as a CPU (Central Processing Unit) or a GPU (Graphics Processing Unit). The arithmetic unit 44 includes a fuel injection amount setting unit 46, a required power setting unit 47, a target rotational frequency setting unit 48, and a condition determination unit 49. The fuel injection amount setting unit 46, the required power setting unit 47, the target rotational frequency setting unit 48, and the condition determination unit 49 are realized by executing the program stored in the storage unit 45 by the arithmetic unit 44. At least part of the fuel injection amount setting unit 46, the required power setting unit 47, the target rotational frequency setting unit 48, and the condition determination unit 49 may be implemented by an integrated circuit such as an ASIC (Application Specific Integrated Circuit) or an FPGA (Field-Programmable Gate Array). At least part of the fuel injection amount setting unit 46, the required power setting unit 47, the target rotational frequency setting unit 48, and the condition determination unit 49 may be implemented by an electronic circuit including discrete devices.

The storage unit 45 is made up from a volatile memory (not shown) and a nonvolatile memory (not shown), which are computer-readable storage media. The volatile memory is, for example, a RAM (Random Access Memory) and the like. The nonvolatile memory is, for example, a ROM (Read Only Memory), a flash memory, and the like. Data and the like are stored, for example, in the volatile memory. Programs, tables, maps, and the like are stored, for example, in the non-volatile memory. At least part of the storage unit 45 may be provided in the above-described processor, integrated circuit, and the like.

The fuel injection amount setting unit 46 sets the amount of fuel to be injected into the combustion chamber 26 of the gas turbine 16. Fuel is injected into the combustion chamber 26 of the gas turbine 16 based on the amount of fuel injection set by the fuel injection amount setting unit 46.

The required power setting unit 47 sets the required power for the generator 18. The converter 20 adjusts a power generation load of the generator 18 according to the required power. The rotational frequency of the gas turbine 16 is controlled by adjusting the amount of fuel injected into the combustion chamber 26 of the gas turbine 16 and the power generation load of the power generator 18. For example, when the amount of fuel injection decreases in a state where the power generation load is maintained, the rotational frequency of the gas turbine 16 reduces.

The target rotational frequency setting unit 48 sets a target rotational frequency of the gas turbine 16. The target rotational frequency is set in accordance with the target output power. The relationship between the target output power and the target rotational frequency will be described in detail later.

The condition determination unit 49 determines whether the relationship between the target output power and the rotational frequency of the gas turbine 16 satisfies a predetermined condition. The predetermined conditions will be described later in detail.

Movable Region of Gas Turbine

Figure 3:
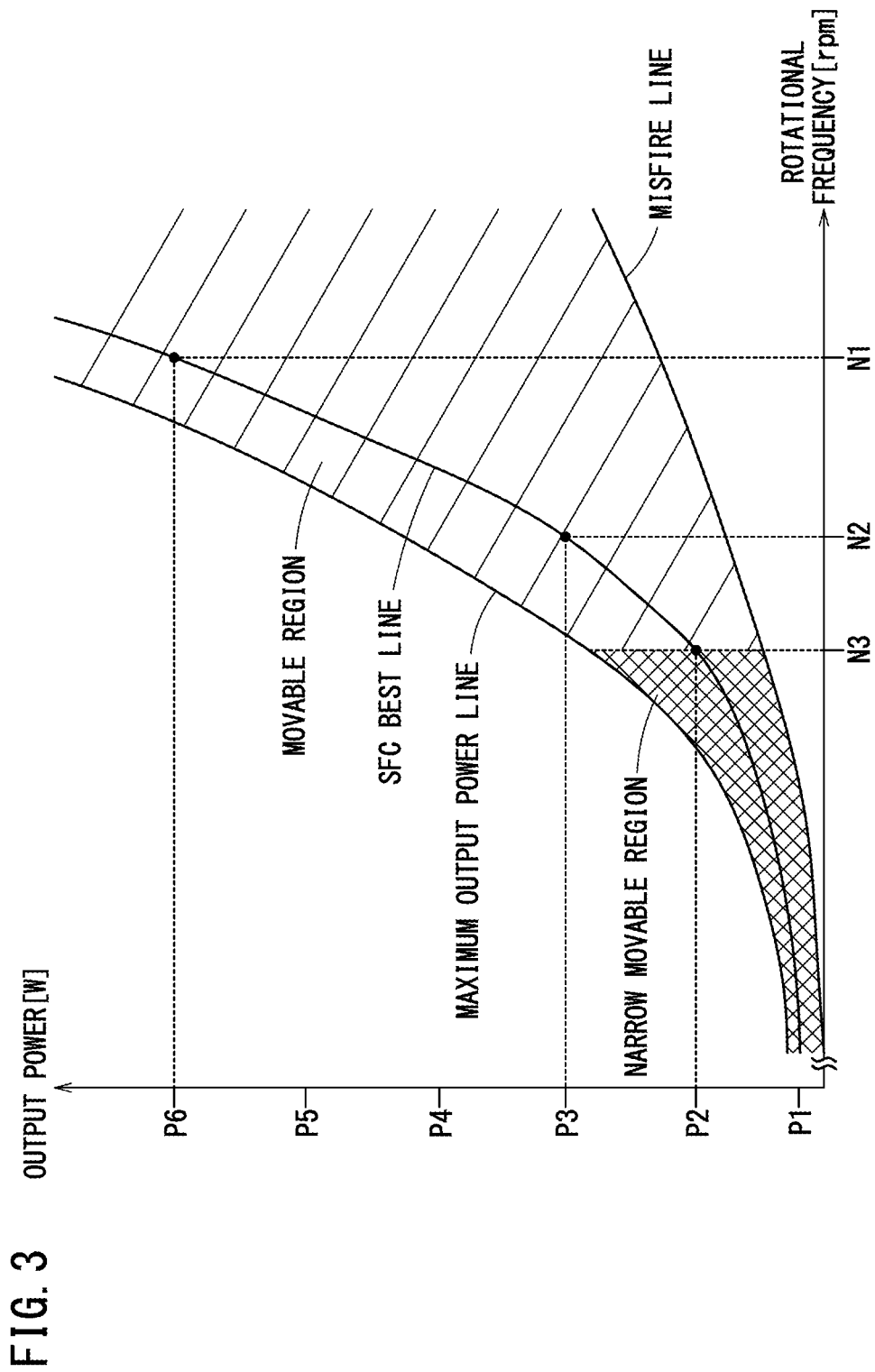
FIG. 3 is a graph showing a movable region of a gas turbine.

FIG. 3 is a graph showing the movable region of the gas turbine 16. The horizontal axis of the graph in FIG. 3 represents the rotational frequency of the gas turbine 16. The vertical axis of the graph of FIG. 3 represents the output power of the gas turbine 16.

A misfire line shown in FIG. 3 shows the minimum output power of the gas turbine 16 with respect to the rotational frequency of the gas turbine 16. When an operating point determined by the rotational frequency and the output power of the gas turbine 16 is located below the misfire line, it is possible that misfire will occur in the combustion chamber 26 and the gas turbine 16 will stop. A maximum output power line shown in FIG. 3 shows the maximum output power of the gas turbine 16 corresponding to the rotational frequency of the gas turbine 16. If the operating point of the gas turbine 16 is located above the maximum output power line, it is possible that the compressor 24 will stall and the gas turbine 16 will stop. Alternatively, if the operating point of the gas turbine 16 is located above the maximum output power line, it is possible that the temperature of the gas delivered to the turbine 28 will become too high. Therefore, the operating point of the gas turbine 16 needs to be located within the movable region flanked by the misfire line and the maximum output power line.

An SFC (Specific Fuel Consumption) best line shown in FIG. 3 shows the relationship between the rotational frequency and the output power of the gas turbine 16 that gives the best fuel consumption rate. For example, when the output power of the gas turbine 16 is maintained at P3 [W], it is necessary to increase the amount of fuel injected into the combustion chamber 26 as the rotational frequency of the turbine 28 becomes larger beyond N2. When the output power of the gas turbine 16 is maintained at P3 [W], it is necessary to increase the amount of fuel injected into the combustion chamber 26 as the rotational frequency of the turbine 28 becomes smaller compared with N2. The target rotational frequency with respect to the target output power is set based on the SFC best line.

Output Power Reduction Control of Gas Turbine

The target output power of the gas turbine 16 is determined in accordance with the required output power of the electric motor 36. That is, when the required output power of the electric motor 36 decreases, the target output power also decreases. When the target output power decreases, the hybrid controller 40 performs output power reduction control to reduce the output power of the gas turbine 16.

When the relationship between the target output power and the rotational frequency of the gas turbine 16 satisfies a predetermined condition, the hybrid controller 40 performs the first output power reduction control. On the other hand, when the relationship between the target rotational frequency and the rotational frequency of the gas turbine 16 does not satisfy the predetermined condition, the hybrid controller 40 performs the second output power reduction control.

The predetermined condition is that a virtual operating point is located above the misfire line. The virtual operating point is an operating point defined by the target output power and the rotational frequency of the gas turbine 16 at the start of the output power reduction control.

Even when the relationship between the target output power and the rotational frequency of the gas turbine 16 satisfies the above-described predetermined condition, the hybrid controller 40 may perform the second output power reduction control if the rotational frequency of the gas turbine 16 at the start of the output power reduction control is equal to or less than the rotational frequency N3 [rpm]. When the rotational frequency of the gas turbine 16 is less than or equal to the rotational frequency N3 [rpm], the operating point of the gas turbine 16 at the start of the output power reduction control is located in a narrow movable region shown in FIG. 3.

In the first output power reduction control, the hybrid controller 40 reduces the rotational frequency of the gas turbine 16 to the target rotational frequency after reducing the output power of the gas turbine 16 to the target output power. On the other hand, in the second output power reduction control, the hybrid controller 40 reduces the output power of the gas turbine 16 to the target output power after reducing the rotational frequency of the gas turbine 16 to the target rotational frequency.

First Output Power Reduction Control

Figure 4A:
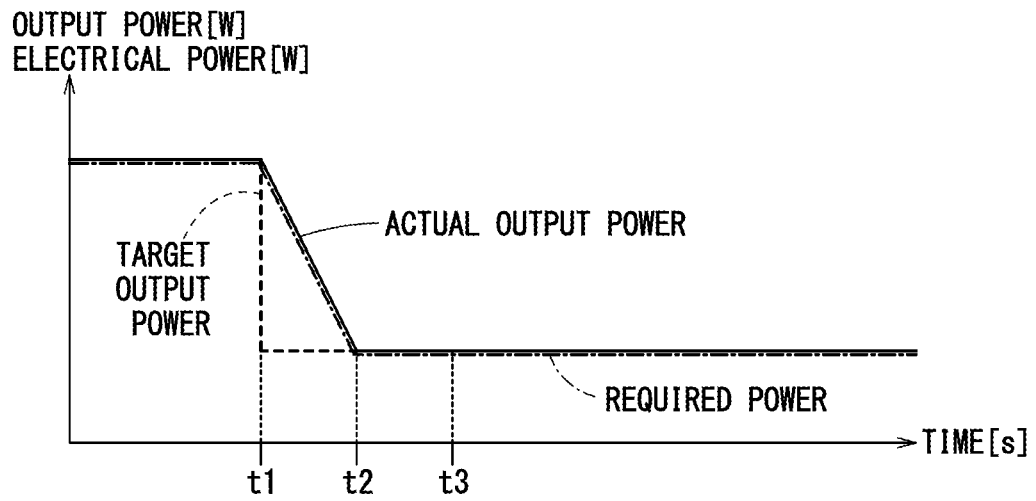
FIGS. 4A and 4B are diagrams for explaining the concept of a first output power reduction control.
Figure 4B:
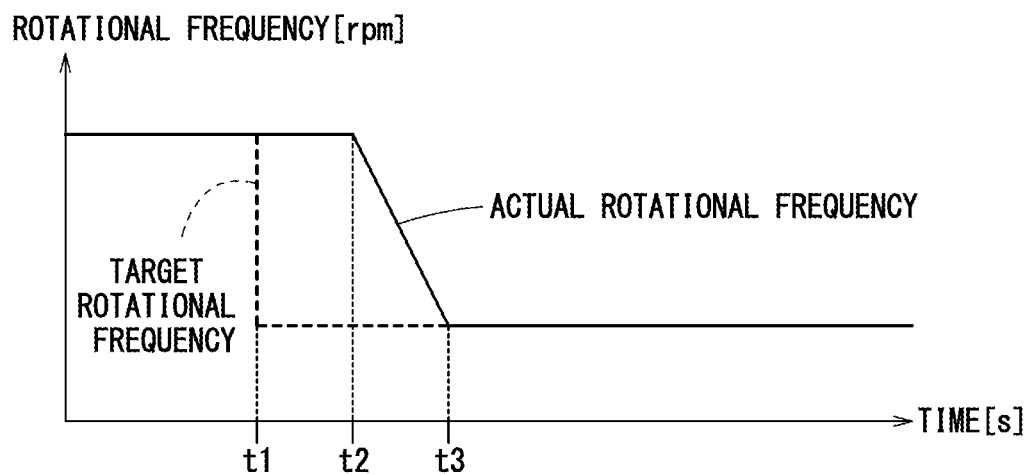

Hereinafter, the first output power reduction control will be described. FIGS. 4A and 4B are diagrams for explaining the concept of a first output power reduction control. FIG. 4A is a graph showing changes with respect to time in the target output power of the gas turbine 16, the output power (actual output power) of the gas turbine 16, and the required power of the generator 18. FIG. 4B is a graph showing changes with respect to time in the target rotational frequency of the gas turbine 16 and the rotational frequency (actual rotational frequency) of the gas turbine 16. FIGS. 4A and 4B conceptually show changes of each element with respect to time.

At time point t1, the target output power decreases. Together with this, the target rotational frequency reduces. After time t1, the required power setting unit 47 gradually lowers the required power. At the same time, the fuel injection amount setting unit 46 gradually decreases the amount of fuel injection. As a result, the actual output power gradually decreases. In this case, the rotational frequency of the gas turbine 16 hardly changes because of the inertia of the rotary elements of the gas turbine 16.

At time point t2, the actual output power decreases to the target output power. After time t2, the required power setting unit 47 maintains the required power. At this time, the fuel injection amount setting unit 46 further decreases the amount of fuel injection. As a result, the rotational frequency of the gas turbine 16 reduces.

At time t3, the actual rotational frequency reduces to the target rotational frequency. At time point t3, the fuel injection amount setting unit 46 maintains the amount of fuel injection while the required power setting unit 47 maintains the required power. Thus, the hybrid controller 40 can set the output power of the gas turbine 16 to the target output power and set the rotational frequency of the gas turbine 16 to the target rotational frequency.

Figure 5:
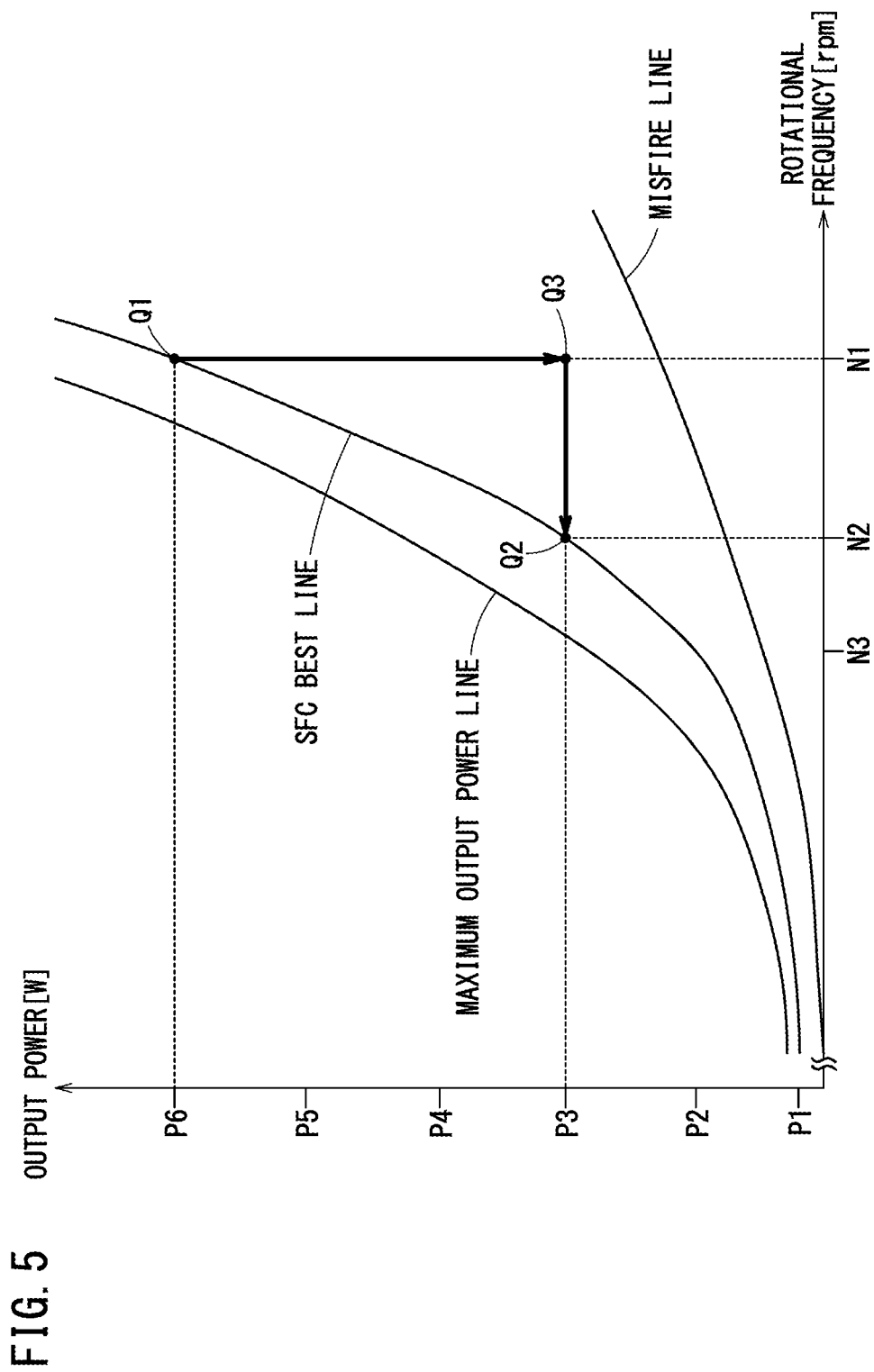
FIG. 5 is a graph showing movements of the operating point of the gas turbine.

The first output power reduction control will be described with reference to the operating point of the gas turbine 16. FIG. 5 is a graph showing the movement of the operating point of the gas turbine 16. The horizontal axis of the graph in FIG. 5 represents the rotational frequency of the gas turbine 16. The vertical axis of the graph of FIG. 5 represents the output power of the gas turbine 16. An arrow in FIG. 5 indicates a moving direction of the operating point of the gas turbine 16.

At the start of the output power reduction control, the output power of the gas turbine 16 is P6 [W] and the rotational frequency of the gas turbine 16 is N1 [rpm]. In this case, the operating point of the gas turbine 16 is located at the point Q1. The target output power is P3 [W] and the target rotation frequency with respect to the target output power is N2 [rpm]. In this case, the operating point of the gas turbine 16 is located at the point Q2.

The virtual operating point defined by the target output power P3 [W] and the rotational frequency N1 [rpm] of the gas turbine 16 at the start of the output power reduction control is located at the point Q3. The virtual operating point Q3 is located above the misfire line. Therefore, the first output power reduction control is executed.

In the first output power reduction control, first, the required power setting unit 47 lowers the required power, and the fuel injection amount setting unit 46 lowers the amount of fuel injection. As a result, the output power of the gas turbine 16 decreases. In this case, the rotational frequency of the gas turbine 16 hardly changes because of the inertia of the rotary elements of the gas turbine 16. As a result, the operating point of the gas turbine 16 moves from the point Q1 to the point Q3.

When the output power of the gas turbine 16 decreases to the target output power P3 [W], in a state where the required power setting unit 47 maintains the required power, the fuel injection amount setting unit 46 further decreases the amount of fuel injection. When the amount of fuel injection decreases, the output power of the gas turbine 16 temporarily decreases, and the gas turbine 16 decelerates. However, as the gas turbine 16 decelerates, the operating point of the gas turbine 16 approaches the SFC best line and thus the output power of the gas turbine 16 is recovered. Therefore, in a state where the output power of the gas turbine 16 is substantially maintained, the operating point of the gas turbine 16 moves from the point Q3 toward the point Q2.

When the rotational frequency of the gas turbine 16 reaches the target rotational frequency N2 [rpm], the fuel injection amount setting unit 46 maintains the amount of fuel injection while the required power setting unit 47 maintains the required power. Thus, the operating point of the gas turbine 16 is positioned at the point Q2.

Second Output Power Reduction Control

Figure 6A:
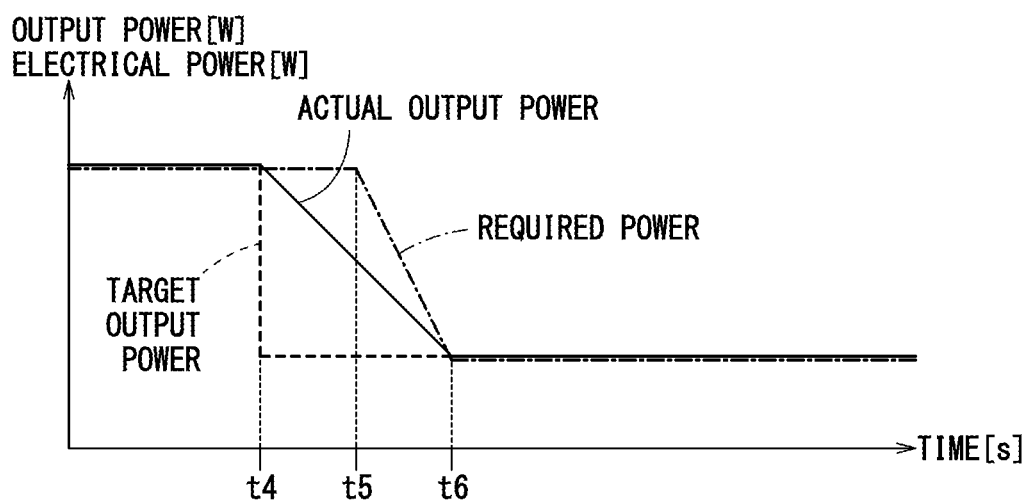
FIGS. 6A and 6B are diagrams for explaining the concept of a second output power reduction control.
Figure 6B:
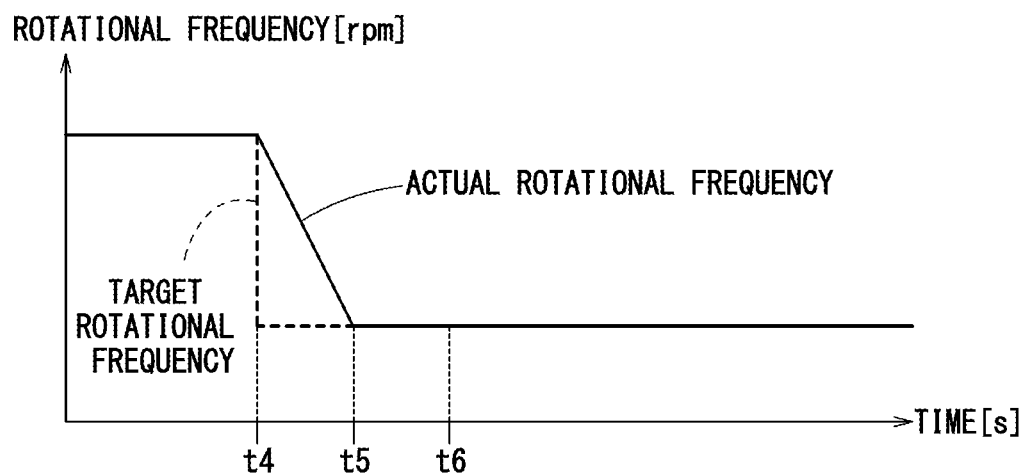

Hereinafter, the second output power reduction control will be described. FIGS. 6A and 6B are diagrams for explaining the concept of a second output power reduction control. FIG. 6A is a graph showing changes with respect to time in the target output power of the gas turbine 16, the output power (actual output power) of the gas turbine 16, and the required power of the generator 18. FIG. 6B is a graph showing changes with respect to time in the target rotational frequency of the gas turbine 16 and the rotational frequency (actual rotational frequency) of the gas turbine 16. FIGS. 6A and 6B conceptually show changes of each element with respect to time.

At time point t4, the target output power decreases. Together with this, the target rotational frequency reduces. After time point t4, the required power setting unit 47 maintains the required power. At this time, the fuel injection amount setting unit 46 gradually decreases the amount of fuel injection. As a result, the actual output power gradually decreases and the gas turbine 16 gradually decelerates.

At time t5, the actual rotational frequency is reduced to the target rotational frequency. After time t5, the required power setting unit 47 gradually lowers the required power. At this time, the fuel injection amount setting unit 46 further decreases the amount of fuel injection. As a result, the actual output power gradually decreases. In this case, the rotational frequency of the gas turbine 16 hardly changes because of the inertia of the rotary elements of the gas turbine 16.

At time point t6, the actual output power decreases to the target output power. At time point t6, the fuel injection amount setting unit 46 maintains the amount of fuel injection while the required power setting unit 47 maintains the required power. Thus, the hybrid controller 40 can set the output power of the gas turbine 16 to the target output power and set the rotational frequency of the gas turbine 16 to the target rotational frequency.

Figure 7:
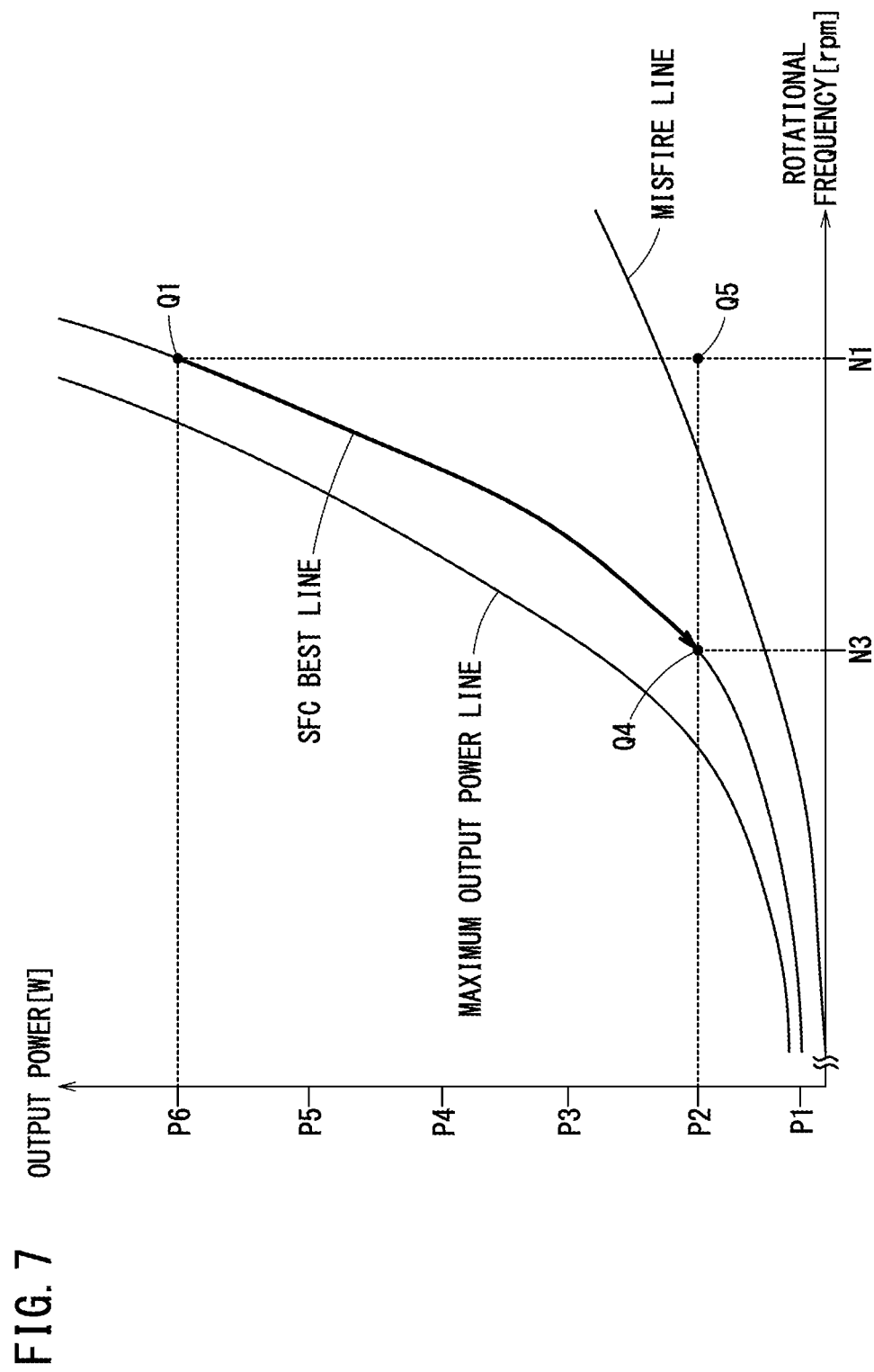
FIG. 7 is a graph showing movements of the operating point of the gas turbine.

The second output power reduction control will be described with reference to the operating point of the gas turbine 16. FIG. 7 is a graph showing the movement of the operating point of the gas turbine 16. The horizontal axis of the graph in FIG. 7 represents the rotational frequency of the gas turbine 16. The vertical axis of the graph of FIG. 7 shows the output power of the gas turbine 16. An arrow in FIG. 7 indicates a moving direction of the operating point of the gas turbine 16.

At the start of the output power reduction control, the output power of the gas turbine 16 is P6 [W] and the rotational frequency of the gas turbine 16 is N1 [rpm]. In this case, the operating point of the gas turbine 16 is located at the point Q1. The target output power is P2 [W], and the target rotation frequency with respect to the target output power is N3 [rpm]. In this case, the operating point of the gas turbine 16 is located at the point Q4.

The virtual operating point defined by the target output power P2 [W] and the rotational frequency N1 [rpm] of the gas turbine 16 at the start of the output power reduction control is located at the point Q5. The virtual operating point Q5 is located below the misfire line. Therefore, the second output power reduction control is executed.

In the second output power reduction control, first, in a state where the required power setting unit 47 maintains the required power, the fuel injection amount setting unit 46 reduces the amount of fuel injection. Thereafter, the required power setting unit 47 lowers the required power. As a result, the output power of the gas turbine 16 decreases and the gas turbine 16 decelerates. As a result, the operating point of the gas turbine 16 moves from the point Q1 to the point Q4.

Time Required for Output Power Reduction Control

As described above, the first output power reduction control is performed when the virtual operating point is located above the misfire line whereas the first output power reduction control is not performed when the virtual operating point is located below the misfire line. This is because when the virtual operating point is located below the misfire line, the time required for the first output power reduction control becomes longer than the time required for the second output power reduction control.

Hereinafter, the first output power reduction control performed when the virtual operating point is located below the misfire line will be described.

Figure 8:
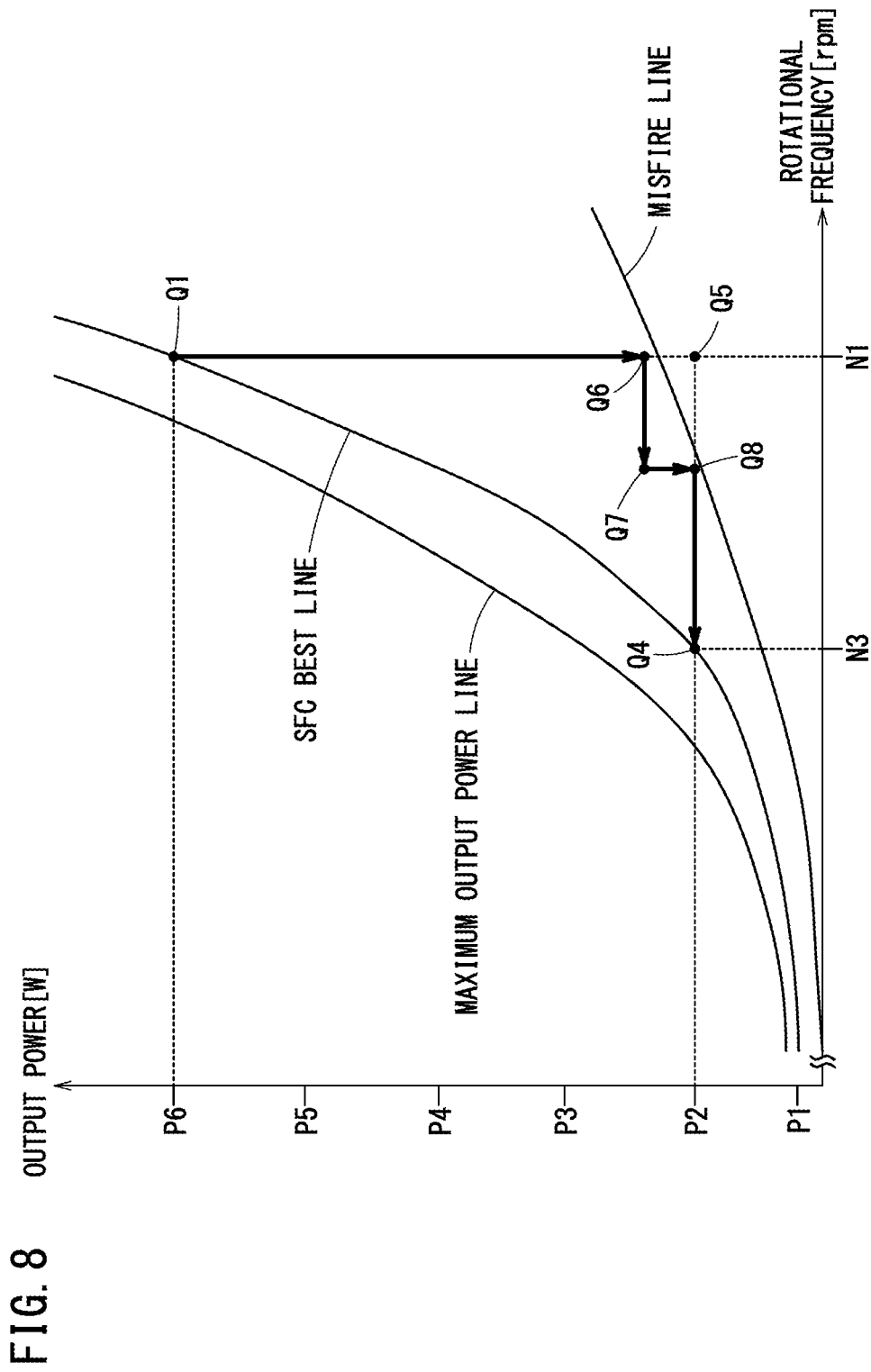
FIG. 8 is a graph showing movements of the operating point of the gas turbine.

FIG. 8 is a graph showing the movement of the operating point of the gas turbine 16. The horizontal axis of the graph in FIG. 8 represents the rotational frequency of the gas turbine 16. The vertical axis of the graph of FIG. 8 shows the output power of the gas turbine 16. An arrow in FIG. 8 indicates a moving direction of the operating point of the gas turbine 16.

At the start of the output power reduction control, the output power of the gas turbine 16 is P6 [W] and the rotational frequency of the gas turbine 16 is N1 [rpm]. In this case, the operating point of the gas turbine 16 is located at the point Q1. The target output power is P2 [W], and the target rotation frequency with respect to the target output power is N3 [rpm]. The operating point of the gas turbine 16 is located in this case at the point Q4.

The virtual operating point of the gas turbine 16, which is determined by the target output power P2 [W] and the rotational frequency N1 [rpm] of the gas turbine 16 when the output power reduction control is started, is located at the point Q5. The virtual operating point Q5 is located below the misfire line.

In the first output power reduction control, first, the required power setting unit 47 lowers the required power, and the fuel injection amount setting unit 46 lowers the amount of fuel injection. As a result, the output power of the gas turbine 16 decreases. In this case, the rotational frequency of the gas turbine 16 hardly changes because of the inertia of the rotary elements of the gas turbine 16. As a result, the operating point of the gas turbine 16 moves from the point Q1 to the point Q6. The operating point Q6 is located above the misfire line.

After the operating point of the gas turbine 16 moves to the point Q6, in a state where the required power setting unit 47 maintains the required power, the fuel injection amount setting unit 46 further decreases the amount of fuel injection. When the amount of fuel injection decreases, the output power of the gas turbine 16 temporarily decreases, and the gas turbine 16 decelerates. However, as the gas turbine 16 decelerates, the operating point of the gas turbine 16 approaches the SFC best line and thus the output power of the gas turbine 16 is recovered. Therefore, in a state where the output power of the gas turbine 16 is substantially maintained, the operating point of the gas turbine 16 moves from the point Q6 to the point Q7.

After the operating point of the gas turbine 16 moves to the point Q7, the required power setting unit 47 lowers the required power, and the fuel injection amount setting unit 46 lowers the amount of fuel injection. As a result, the operating point of the gas turbine 16 moves from the point Q7 to the point Q8. The operating point Q8 is located above the misfire line.

After the operating point of the gas turbine 16 moves to the point Q8, in a state where the required power setting unit 47 maintains the required power, the fuel injection amount setting unit 46 further decreases the amount of fuel injection. When the amount of fuel injection decreases, the output power of the gas turbine 16 temporarily decreases, and the gas turbine 16 decelerates. However, as the gas turbine 16 decelerates, the operating point of the gas turbine 16 approaches the SFC best line and thus the output power of the gas turbine 16 is recovered. Therefore, in a state where the output power of the gas turbine 16 is substantially maintained, the operating point of the gas turbine 16 moves from the point Q8 to the point Q4.

When the virtual operating point is located below the misfire line, the first output power reduction control requires more time than the second output power reduction control to reduce the output power of the gas turbine 16 to the target output power. Therefore, there is a problem that more electric power than is consumed by the electric motor 36 is generated by the generator 18, and the surplus electric power becomes excessive.

FIG. 9 is a table comparing the time (required time) required to reduce the output power of the gas turbine 16 to the target output power. FIG. 9 shows the time required for the first output power reduction control and the time required for the second output power reduction control. The term "Satisfied" in the condition column of FIG. 9 indicates that a condition that the virtual operating point be positioned above the misfire line is satisfied. The term "Not satisfied" in the condition column of FIG. 9 indicates that a condition that the virtual operating point be positioned above the misfire line is not satisfied.

As shown in FIG. 9, when the condition that the virtual operating point be located above the misfire line is satisfied, the time required for the first output power reduction control is shorter than the time required for the second output power reduction control. On the other hand, when the condition that the virtual operating point be positioned above the misfire line is not satisfied, the time required for the first output power reduction control is longer than the time required for the second output power reduction control.

Process of Output Power Reduction Control

FIG. 10 is a flowchart showing a process of the output power reduction control. The output power reduction control is executed by the hybrid controller 40 from the time when the gas turbine 16 is activated to the time when the gas turbine 16 is stopped.

In step S1, the hybrid controller 40 activates the power unit system 10. Thereafter, the process proceeds to step S2.

In step S2, the hybrid controller 40 determines whether the power unit system 10 is normal. When the power unit system 10 is normal (step S2: YES), the process proceeds to step S3. When an abnormality occurs in the power unit system 10 (step S2: NO), the process proceeds to step S15.

In step S3, the hybrid controller 40 determines whether there is a request for output power reduction. If there is the request for output power reduction (step S3: YES), the process proceeds to step S4. If there is no request for output power reduction (step S3: NO), the process returns to step S2. When the target output power is lower than the output power of the gas turbine 16, the hybrid controller 40 determines that there is a request for output power reduction.

In step S4, the condition determination unit 49 determines whether the operating point of the gas turbine 16 is located in the narrow movable region. When the operating point of the gas turbine 16 is located in the narrow movable region (step S4: YES), the process proceeds to step S10. When the operating point of the gas turbine 16 is not located in the narrow movable region (step S4: NO), the process proceeds to step S5.

In step S5, the condition determination unit 49 determines whether the virtual operating point of the gas turbine 16 is located above the misfire line. When the virtual operating point is located above the misfire line (step S5: YES), the process proceeds to step S6. When the virtual operating point is located below the misfire line (step S5: NO), the process proceeds to step S10.

When the virtual operating point is located on the misfire line, the process may proceed to step S6. Alternatively, when the virtual operating point is located on the misfire line, the process may proceed to step S10.

In the following steps S6 to S9, the first output power reduction control is performed. In step S6, the hybrid controller 40 reduces the output power of the gas turbine 16. Thereafter, the process proceeds to step S7.

In step S7, the hybrid controller 40 determines whether the output power of the gas turbine 16 has reached the target output power. When the output power of the gas turbine 16 has reached the target output power (step S7: YES), the process proceeds to step S8. When the output power of the gas turbine 16 is not equal to the target output power (step S7: NO), the process returns to step S6.

In step S8, the hybrid controller 40 reduces the rotational frequency of the gas turbine 16. Thereafter, the process proceeds to step S9.

In step S9, the hybrid controller 40 determines whether the rotational frequency of the gas turbine 16 has reached the target rotational frequency. When the rotational frequency of the gas turbine 16 has reached the target rotational frequency (step S9: YES), the process proceeds to step S14. When the rotational frequency of the gas turbine 16 is not the target rotational frequency (step S9: NO), the process returns to step S8.

In the following steps S10 to S13, the second output power reduction control is performed. In step S10, the hybrid controller 40 reduces the rotational frequency of the gas turbine 16. Thereafter, the process proceeds to step S11.

In step S11, the hybrid controller 40 determines whether the rotational frequency of the gas turbine 16 has reached the target rotational frequency. When the rotational frequency of the gas turbine 16 has reached the target rotational frequency (step S11: YES), the process proceeds to step S12. When the rotational frequency of the gas turbine 16 has not yet reached the target rotational frequency (step S11: NO), the process returns to step S10.

In step S12, the hybrid controller 40 reduces the output power of the gas turbine 16. Thereafter, the process proceeds to step S13.

In step S13, the hybrid controller 40 determines whether the output power of the gas turbine 16 has reached the target output power. When the output power of the gas turbine 16 has reached the target output power (step S13: YES), the process proceeds to step S14. When the output power of the gas turbine 16 has not yet reached the target output power (step S13: NO), the process returns to step S12.

In step S14, the hybrid controller 40 determines whether there is a request to stop the gas turbine 16. When there is a request to stop the gas turbine 16 (step S14: YES), the process proceeds to step S15. If there is no request to stop the gas turbine 16 (step S14: NO), the process returns to step S2.

In step S15, the hybrid controller 40 stops the power unit system 10. Thereafter, the output power reduction control is terminated.

Benefits

When the output power of the gas turbine 16 is larger than the target output power, more electric power than is consumed by the electric motor 36 is generated by the generator 18, and thus surplus electric power is generated. The excess power is charged in the battery 22. However, when the surplus power becomes excessive, there is a possibility that the battery 22 will be overcharged. Although the overcharge of the battery 22 can be suppressed by increasing the capacity of the battery 22, there is a problem that the battery 22 will become large.

Therefore, in the present embodiment, when the output power of the gas turbine 16 is reduced, if the virtual operating point is located above the misfire line, the hybrid controller 40 performs the first output power reduction control. On the other hand, if the virtual operating point is located below the misfire line, the hybrid controller 40 performs the second output power reduction control. Thus, the time required to reduce the output power of the gas turbine 16 to the target output power can be shortened. Therefore, the amount of surplus electric power can be suppressed. As a result, the overcharge of the battery 22 can be suppressed. Further, the size of the battery 22 can be reduced.

The present invention is not limited to the above-described embodiments, and various configurations can be adopted therein without departing from the essence and gist of the present invention.

Invention Obtained from Embodiment

The invention that can be understood from the above embodiments will be described below.

The control device (40) for the power unit system (10) includes: the gas turbine (16) that includes the compressor (24) and the turbine (28) rotating together with the compressor; the generator (18) that is driven by the gas turbine; the battery (22) that stores electric power generated by the generator; the required power setting unit (47) that sets required power for the generator; the fuel injection amount setting unit (46) that controls the injection amount of fuel to be injected into the combustion chamber (26) of the gas turbine; the target rotational frequency setting unit (48) that sets the target rotational frequency of the gas turbine with respect to target output power of the gas turbine; and the condition determination unit (49) that determines whether the relationship between the target output power and the rotational frequency of the gas turbine satisfies predetermined conditions, wherein when the output power of the gas turbine is going to be reduced and when the relationship between the target output power and the rotational frequency of the gas turbine satisfies the predetermined conditions, the required power setting unit reduces the required power and the fuel injection amount setting unit reduces the injection amount, whereby the output power of the gas turbine is reduced to the target output power, and thereafter the required power setting unit maintains the required power and the fuel injection amount setting unit reduces the injection amount, whereby the rotational frequency of the gas turbine is reduced to the target rotational frequency, and when the output power of the gas turbine is going to be reduced and when the relationship between the target output power and the rotational frequency of the gas turbine does not satisfy the predetermined conditions, the required power setting unit maintains the required power and the fuel injection amount setting unit reduces the injection amount, whereby the rotational frequency of the gas turbine is reduced to the target rotational frequency, and thereafter the required power setting unit reduces the required power and the fuel injection amount setting unit reduces the injection amount, whereby the output power of the gas turbine is reduced to the target output power. Thus, overcharge of the battery can be suppressed. Further, the battery can be reduced in size.

At least one of the predetermined conditions may be that the virtual operating point determined by the target output power and the rotational frequency of the gas turbine before the output power of the gas turbine is reduced is located above the misfire line that indicates the predetermined relationship between the output power and the rotational frequency of the gas turbine. Thus, overcharge of the battery can be suppressed. Further, the battery can be reduced in size.

The invention claimed is:

1. A control device for a power unit system, the control device comprising:
    a gas turbine that includes a compressor and a turbine rotating together with the compressor;
    a generator that is driven by the gas turbine;
    a battery that stores electric power generated by the generator;
    a required power setting unit that sets required power for the generator;
    a fuel injection amount setting unit that controls an injection amount of fuel to be injected into a combustion chamber of the gas turbine;
    a target rotational frequency setting unit that sets a target rotational frequency of the gas turbine with respect to target output power of the gas turbine; and
    a condition determination unit that determines whether a relationship between the target output power and a rotational frequency of the gas turbine satisfies predetermined conditions,
    wherein
    when an output power of the gas turbine is going to be reduced and when the relationship between the target output power and the rotational frequency of the gas turbine satisfies the predetermined conditions, the required power setting unit reduces the required power and the fuel injection amount setting unit reduces the injection amount of fuel, whereby the output power of the gas turbine is reduced to the target output power, and thereafter the required power setting unit maintains the required power and the fuel injection amount setting unit reduces the injection amount of fuel, whereby the rotational frequency of the gas turbine is reduced to the target rotational frequency, and
    when the output power of the gas turbine is going to be reduced and when the relationship between the target output power and the rotational frequency of the gas turbine does not satisfy the predetermined conditions, the required power setting unit maintains the required power and the fuel injection amount setting unit reduces the injection amount of fuel, whereby the rotational frequency of the gas turbine is reduced to the target rotational frequency, and thereafter the required power setting unit reduces the required power and the fuel injection amount setting unit reduces the injection amount of fuel, whereby the output power of the gas turbine is reduced to the target output power.

2. The control device for the power unit system according to claim 1, wherein at least one of the predetermined conditions is that a virtual operating point determined by the target output power and the rotational frequency of the gas turbine before the output power of the gas turbine is reduced is located above a predetermined misfire line that indicates a relationship between the output power and the rotational frequency of the gas turbine.

* * * * *